(12) United States Patent
Noh et al.

(10) Patent No.: US 8,169,117 B2
(45) Date of Patent: May 1, 2012

(54) BRUSHLESS MOTOR FOR FLUID PUMP AND FLUID PUMP USING THE MOTOR

(75) Inventors: Jongsang Noh, Ulsan (KR); Jonggeun Cha, Ulsan (KR); Jongman Lee, Yangsan (KR)

(73) Assignee: Donghee Industrial Co., Ltd., Ulsan (KR)

( * ) Notice: Subject to any disclaimer, the term of this patent is extended or adjusted under 35 U.S.C. 154(b) by 519 days.

(21) Appl. No.: 12/488,323

(22) Filed: Jun. 19, 2009

(65) Prior Publication Data

US 2010/0166579 A1  Jul. 1, 2010

(30) Foreign Application Priority Data

Dec. 26, 2008 (KR) .................. 10-2008-0134160

(51) Int. Cl.
*H02K 21/12* (2006.01)
*H02K 1/00* (2006.01)
(52) U.S. Cl. ..... 310/156.53; 310/216.097; 310/216.106; 310/156.54
(58) Field of Classification Search ........... 310/216.097, 310/216.106, 216.064, 216.091, 216.107, 310/156.53–156.57
See application file for complete search history.

(56) References Cited

U.S. PATENT DOCUMENTS

| | | | |
|---|---|---|---|
| 6,940,198 B2 | 9/2005 | Ionel et al. | |
| 7,098,567 B2 * | 8/2006 | Ionel et al. | 310/216.062 |
| 7,143,503 B2 | 12/2006 | Ionel et al. | |
| 2002/0171309 A1 * | 11/2002 | Wakui et al. | 310/156.48 |
| 2004/0256940 A1 * | 12/2004 | Tsuruta et al. | 310/156.53 |

FOREIGN PATENT DOCUMENTS

KR  10-2006-0099097 A  9/2006

* cited by examiner

*Primary Examiner* — Quyen Leung
*Assistant Examiner* — Leda Pham
(74) *Attorney, Agent, or Firm* — LRK Patent Law Firm

(57) ABSTRACT

The present invention provides a brushless motor for a fluid pump that allows implementing a fluid pump that overcomes problems of durability and reduction of energy efficiency due to DC motors in the related art and provides excellent operational characteristics, by ensuring a space allowing fluid to flow between a stator and a rotor, and ensuring and maintaining excellent driving characteristics of a motor, and a fluid pump using the brushless motor.

3 Claims, 18 Drawing Sheets

| ITEM | MODEL ACCORDING TO THE RELATED ART |
|---|---|
| SHAPE | <br>* NO CORE SHOE GROOVE IN STATOR<br>* SIMPLE STRUCTURE OF ROTATOR BRIDGE HOLE |
| COGGING TORQUE | <br>* ABOUT 18.25mNm COGGING TORQUE<br>* DESIGN MODIFIED SHAPE FOR REDUCING COGGING(STATOR GROOVE) |
| OPERATIONAL TORQUE | <br>TORQUE RIPPLE<br>* ABOUT 33.7mNm TORQUE RIPPLE<br>* OPERATIONAL TORQUE : 57.2mNm |

FIG.6b

| ITEM | FIRST MODIFIED MODEL |
|---|---|
| SHAPE | *CORE SHOE GROOVE FORMED IN STATOR<br>*TO REDUCE COGGING & RIPPLE |
| COGGING TORQUE | *ABOUT 6.3mNm COGGING TORQUE<br>*COGGING REDUCED, BUT RIPPLE GENERATED(SEE ENLARGED VIEW) |
| OPERATIONAL TORQUE | *ABOUT 18.7mNm TORQUE RIPPLE<br>*ENTIRE RIPPLE REDUCED, BUT TORQUE WAVEFORM DISTORTED(SEE ENLARGED VIEW) |

FIG.6c

| ITEM | MODEL ACCORDING TO THE PRESENT INVENTION |
|---|---|
| SHAPE | 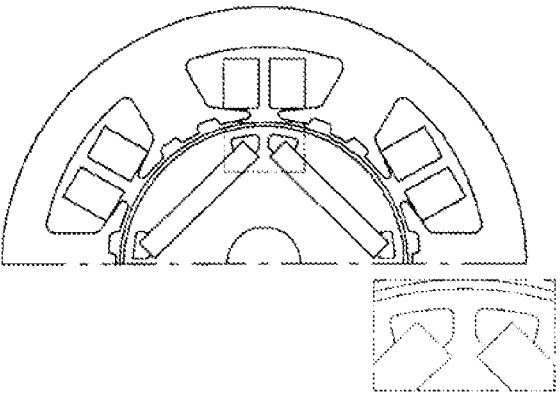<br>* ROTOR BRIDGE HOLE ADDITIONALLY CHANGED IN FIRST MODIFIED MODEL. |
| COGGING TORQUE | 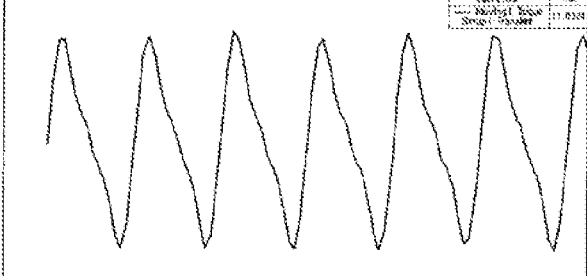<br>* ABOUT 11mNm COGGING TORQUE<br>* ABOUT 7mNm REDUCED FROM INITIAL MODEL |
| OPERATIONAL TORQUE | 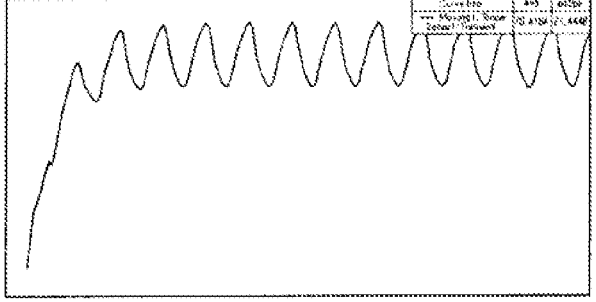<br>* ABOUT 21.4mNm TORQUE RIPPLE<br>(ABOUT 12mNm REDUCED FROM INITIAL MODEL)<br>OPERATIONAL TORQUE : 70.4mNm<br>(13.2mNm INCREASED FROM INITIAL MODEL) |

FIG. 7

| ITEM | MODEL ACCORDING TO THE RELATED ART | FIRST MODIFIED MODEL | MODEL ACCORDING TO THE PRESENT INVENTION |
|---|---|---|---|
| COUNTER ELECTROMOTIVE FORCE | | | |

BRUSHLESS MOTOR FOR FLUID PUMP AND FLUID PUMP USING THE MOTOR

BACKGROUND OF THE INVENTION

1. Field of the Invention

The present invention relates to a brushless motor, in more detail, a structure of a brushless motor that is used in a fluid pump pumping and discharging fluid, and a fluid pump using the brushless motor.

2. Description of the Related Art

In fluid pumps pumping and discharging fluid, fuel pumps that are mounted in a fuel tank of vehicles and pump fuel have been known, and typical DC motors equipped with a common commutator have been used in the fuel pumps in the related art.

The DC motors are configured to be supplied with needed electricity for driving a commutator and a brush, in which the durability has a basic problem due to loose contact by wear of the brush and the method of supplying electricity by using contact of the commutator and the brush consumes a large amount of electric power in operation by reducing the efficiency of the DC motors, thereby reducing energy efficiency.

Brushless motors has been proposed to overcome the defects of the DC motors and an interior permanent magnet brushless motor generally has a small gap between a stator and a rotor because the small gap between the stator and the rotor is advantageous in driving the motor, which is inadequate to a fluid pump that should pump and flow fuel between a stator and a rotor.

SUMMARY OF THE INVENTION

It is an object of the present invention to provide a brushless motor for a fluid pump that allows implementing a fluid pump that overcomes problems of durability and reduction of energy efficiency due to DC motors in the related art and provides excellent operational characteristics, by ensuring a space allowing fluid to flow between a stator and a rotor, and ensuring and maintaining excellent driving characteristics of a motor, and a fluid pump using the brushless motor.

A brushless motor for a fluid pump according to an embodiment of the present invention includes: a stator core having a cross section in which six core shoes symmetrically protrude toward the center of a circle and six slots for winding are formed between the core shoes; in which two core shoe grooves recessed in the longitudinal direction of the stator core the inner side of each of the core shoes are each formed with a center on a core shoe groove center line spaced apart at 8.4°±1° from a straight line passing through the center of the core shoe from the center of the stator core, and the width and depth of the core shoe grooves are 1.5 mm±0.5 mm and 0.53 mm±0.1 mm, respectively; a rotor core, which is inserted in the stator core, has rectangular permanent magnet holes that are formed in the circumferential direction from the center of the rotor core to be filled with four permanent magnets; symmetric bridge holes are formed at both ends of the permanent magnet hole; the bridge hole has a first wall that is spaced apart at 14.7°±2° from a straight line passing through the center of two adjacent permanent magnet holes from the center of the rotor core, a second wall that is connected to the first wall and spaced inside while maintaining a uniform thickness of 0.6 mm±0.1 mm from the outer circumference of the rotor core, a third wall that is connected to the second wall and spaced apart at 0.3 mm±0.1 mm from and in parallel with a straight line passing through the center of two adjacent permanent magnet holes from the center of the rotor core, and a fourth wall that is connected with the first wall and spaced apart at 0.35 mm±0.1 mm from and in parallel with a wall, which is closer to the center of the rotor core, of the permanent magnet hole; and the length of the fourth wall forming the bridge hole is set to 0.41 mm±0.1 mm.

The first wall to the fourth wall forming the bridge hole are connected in the order of the fourth wall-the first wall-the second wall-the third wall, and the portion between the fourth wall and the third wall may be communicated with the permanent magnet hole.

A fluid pump using a brushless motor according to the present invention includes: the brushless motor; a cover in which the brushless motor is disposed; a connector that is disposed to seal one side of the cover, has a terminal for supplying electricity to the brushless motor, and is equipped with a check valve discharging pumped fluid; a spring buffer that elastically supports a rotary shaft of the brushless motor against the connector; a lower casing that is disposed to seal the other side of the cover; an upper casing that is disposed above the lower casing; and an impeller that is disposed between the lower casing and the upper casing and pumps fluid by using rotational force transmitted from the rotary shaft of the brushless motor.

The spring buffer may be composed of a coil spring inserted in a spring-seating groove formed in the connector and a pressing member formed to transmit the elastic force of the coil spring to one end of the rotary shaft of the brushless motor.

The present invention provides a brushless motor for a fluid pump that allows implementing a fluid pump that overcomes problems of durability and reduction of energy efficiency due to DC motors in the related art and provides excellent operational characteristics, by ensuring a space allowing fluid to flow between a stator and a rotor, and ensuring and maintaining excellent driving characteristics of a motor, and a fluid pump using the brushless motor.

BRIEF DESCRIPTION OF THE DRAWINGS

FIGS. 6 and 7 are graphs comparing and showing test results for a model according to the related art, a first modified model, and a model according to the present invention;

DETAILED DESCRIPTION OF THE PREFERRED EMBODIMENTS

Figure 1:
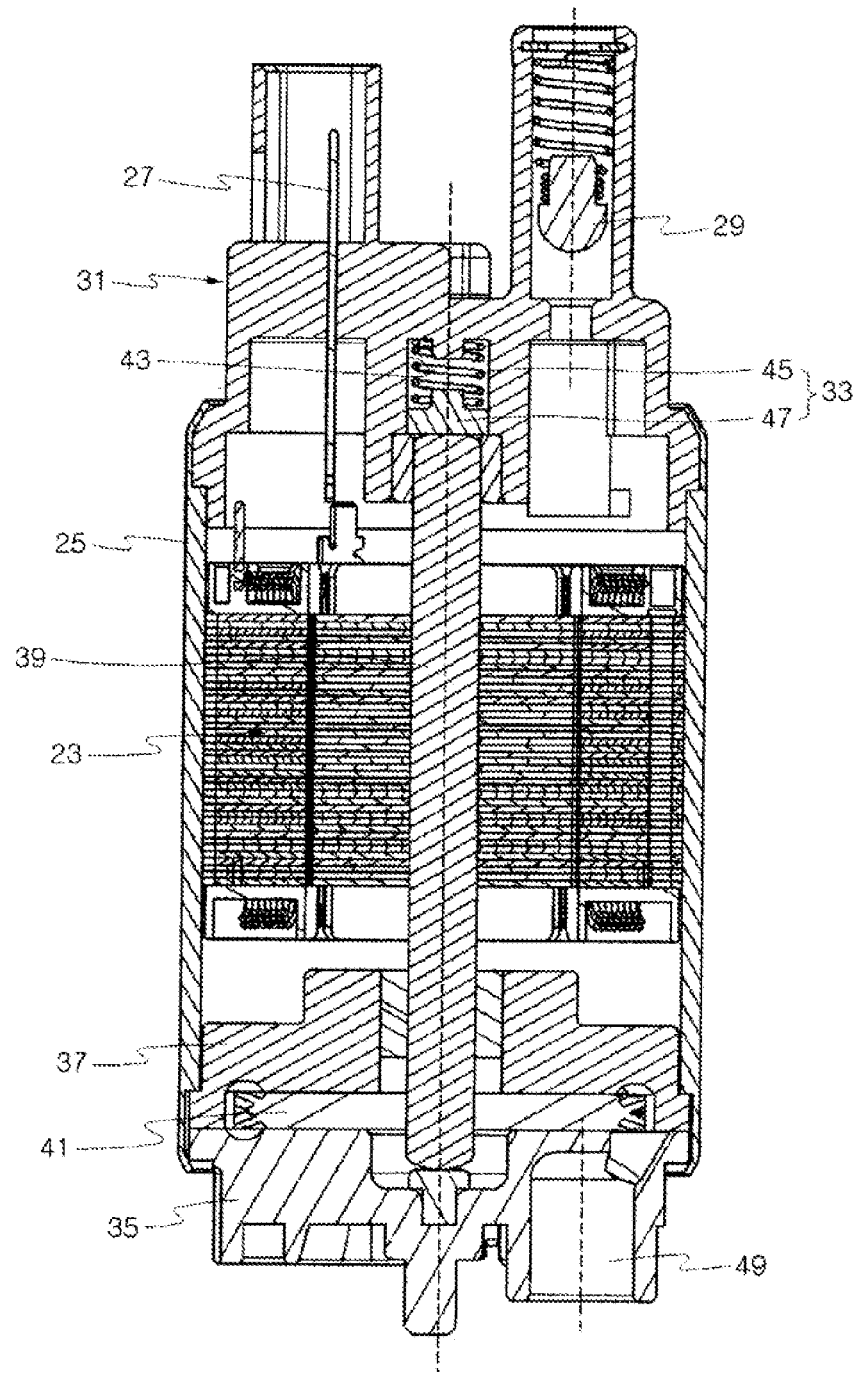
FIG. 1 is a cross-sectional view illustrating the structure of a fluid pump using a brushless motor according to the present invention.
Figure 2:
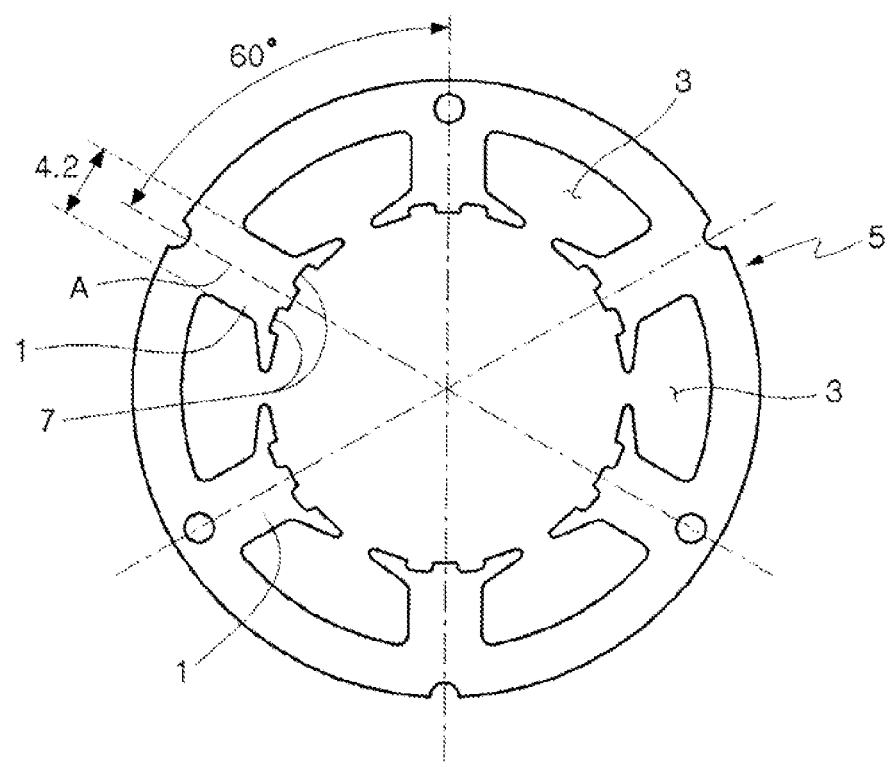
FIG. 2 is a view illustrating the cross-sectional shape of a stator core used in the brushless motor of FIG. 1.
Figure 3:
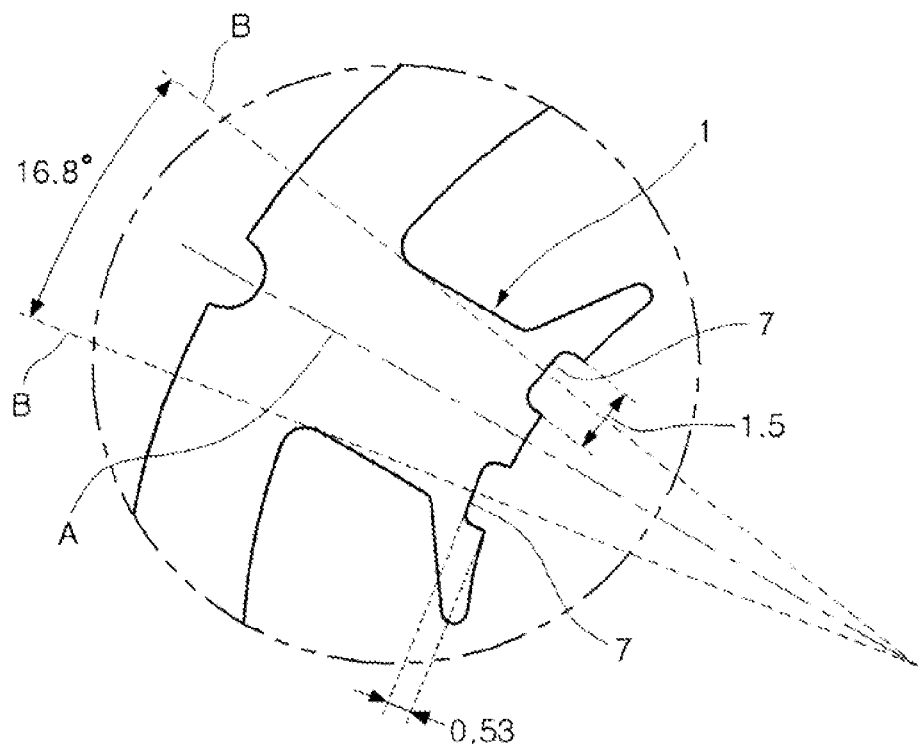
FIG. 3 is a view illustrating in detail the main parts of the stator core of FIG. 2.
Figure 4:
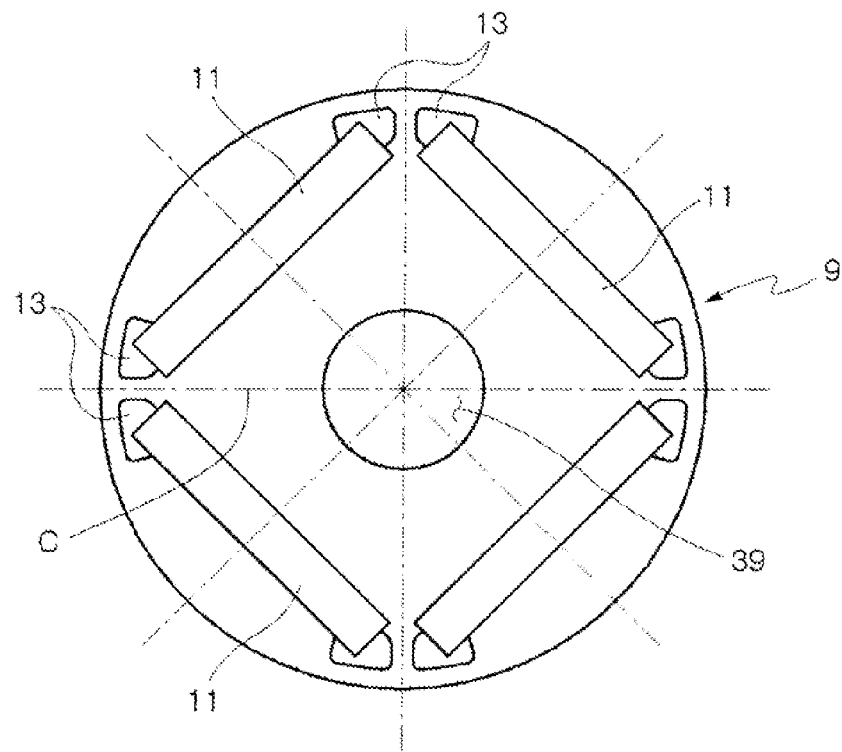
FIG. 4 is a view illustrating the cross-sectional shape of a rotor core used in the brushless motor of FIG. 1.
Figure 5:
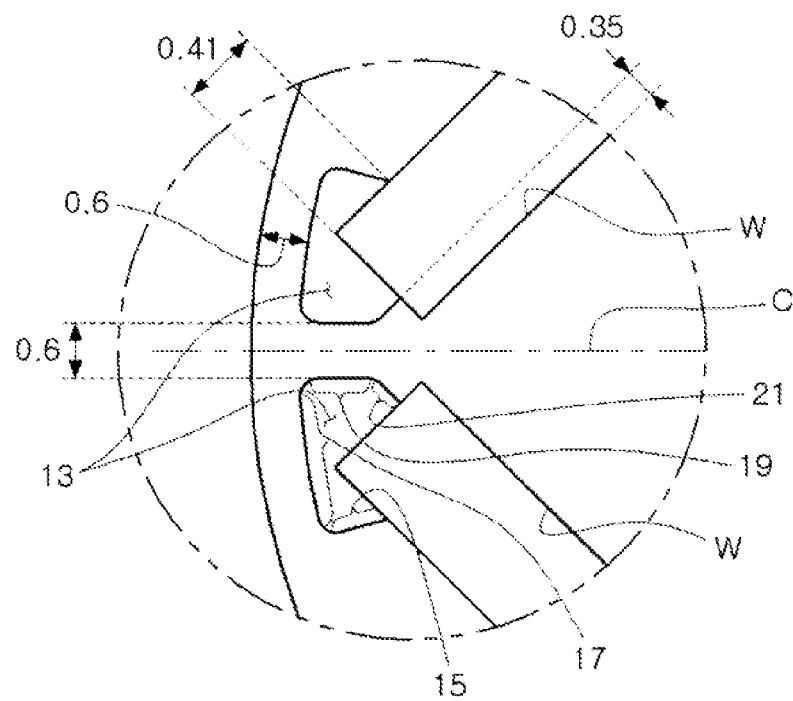
FIG. 5 is a view illustrating in detail the main parts of the rotor core of FIG. 4.

Referring to FIGS. 1 to 5, a brushless motor according to an embodiment of the present invention includes a stator core 5 having a cross section in which six core shoes 1 symmetrically protrude toward the center of a circle and six slots 3 for winding are formed between the core shoes 1, and two core shoe grooves 7 recessed in the longitudinal direction of the stator core 5 are formed on the inner side of each of the core shoes 1.

The two core shoe grooves 7 are each formed with a center on a core shoe groove center line B spaced apart at 8.4° from a straight line A passing through the center of the core shoe 1 from the center of the stator core 5, and the width and depth of the core shoe grooves 7 are 1.5 mm and 0.53 mm, respectively.

A rotor core 9, which is inserted in the stator core 5, has permanent magnet holes 11 that are formed in the circumferential direction from the center of the rotor core 9 to be filled with four permanent magnets. Further, bridge holes 13 are symmetrically formed from the center portion of the permanent magnet hole 11 at both ends of the permanent magnet hole 11.

The permanent magnet hole 11 is formed in a rectangular shape, and the bridge hole 13 has a first wall 15 that is spaced apart at 14.7° from a straight line C passing through the center of two adjacent permanent magnet holes 11 from the center of the rotor core 9, a second wall 17 that is connected to the first wall 15 and spaced inside while maintaining a uniform thickness of 0.6 mm from the outer circumference of the rotor core 9, a third wall 19 that is connected to the second wall 17 and spaced apart at 0.3 mm from and in parallel with a straight line C passing through the center of two adjacent permanent magnet holes 11 from the center of the rotor core 9, and a fourth wall 21 that is connected with the first wall 15 and spaced apart at 0.35 mm from and in parallel with a wall W, which is closer to the center of the rotor core, of the permanent magnet hole 11, in which the length of the fourth wall 21 forming the bridge hole 13 is set to 0.41 mm.

The first wall 15 to the fourth wall 21 forming the bridge hole 13 are connected in the order of the fourth wall 21—the first wall 15—the second wall 17—the third wall 19, and the portion between the fourth wall 21 and the third wall 19 is communicated with the permanent magnet hole 11.

On the other hand, an embodiment of a fluid pump using a brushless motor according to the present invention is configured to include: a brushless motor 23 having the above structure; a cover 25 in which the brushless motor 23 is disposed; a connector 31 that is disposed to seal one side of the cover 25, has a terminal 27 for supplying electricity to the brushless motor 23, and is equipped with a check valve 29 discharging pumped fluid; a spring buffer 33 that elastically supports a rotary shaft 39 of the brushless motor 23 against the connector 31; a lower casing 35 that is disposed to seal the other side of the cover 25; an upper casing 37 that is disposed above the lower casing 35; and an impeller 41 that is disposed between the lower casing 35 and the upper casing 37 and pumps fluid by using rotational force transmitted from the rotary shaft 39 of the brushless motor 23.

For reference, the fluid pump of this embodiment is used as a fuel pump that is mounted in the fuel tank of a vehicle.

The spring buffer 33 is composed of a coil spring 45 inserted in a spring-seating groove 43 formed in the connector 31 and a pressing member 47 formed to transmit the elastic force of the coil spring 45 to one end of the rotary shaft 39 of the brushless motor 23.

The lower casing 35 has an inlet 49 for sucking fluid, such as fuel, and though not clearly shown in the figures, the upper casing 37 has an outlet allowing the impeller 41 to discharge the pumped fluid while rotating.

Accordingly, the fluid discharged through the outlet is stored in a space between the upper casing 37 and the brushless motor 23, flows to the connector 31 through a space between the stator and the rotor of the brushless motor 23, and then is discharged outside through the check valve 29 of the connector 31.

In particular, in the present invention, since the fluid flows through the core shoe grooves 7 when passing through between the stator and the rotor, it is possible to overcome the problem in that sufficient channel is not formed in brushless motors in the related art, such that the fluid can smoothly flow.

Further, the core shoe grooves 7 reduce cogging torque that causes cogging in which the rotor cannot smoothly rotate and rotates while chattering by the relationship between the magnetic field of the permanent magnets of the rotor and the magnetic field formed by the stator core 5 such that the rotor can smoothly rotate.

Meanwhile, the spring buffer 33 allows the stator to stably and smoothly rotate by stably supporting the rotor that is axially moved by pressure change generated in the space between the upper casing 37 and the brushless motor 23 when pumping the fluid as described above.

Further, the detailed structures of the bridge holes 13 of the rotor core 9 increases efficiency of the brushless motor 23 and improves the counter electromotive force waveform for easily controlling the brushless motor 23 without using a sensor.

That is, in controlling electric current that is supplied to stator wires of the brushless motor 23 without using a specific sensor, the control can be more easily achieved by making the counter electromotive force waveform outputted to the wires of the stator in a smooth curve shape without excessive changes.

Figure 6A:
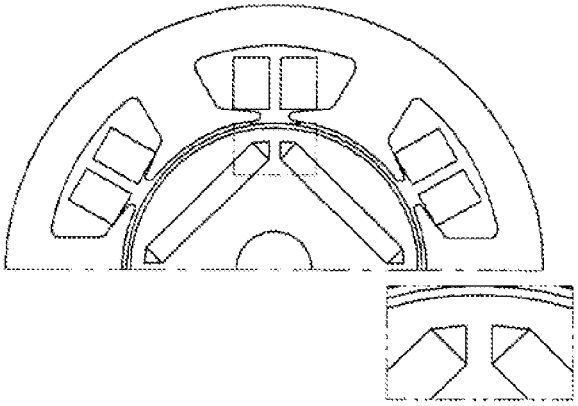
Figure 6A:
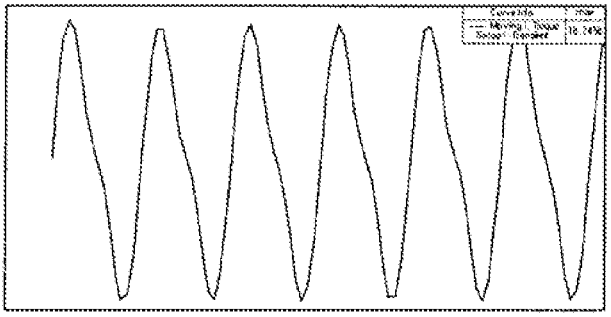
Figure 6A:
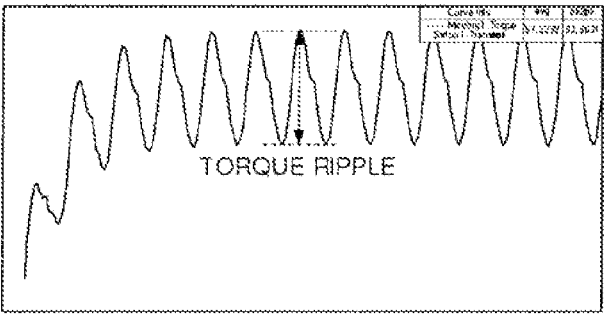
Figure 8:
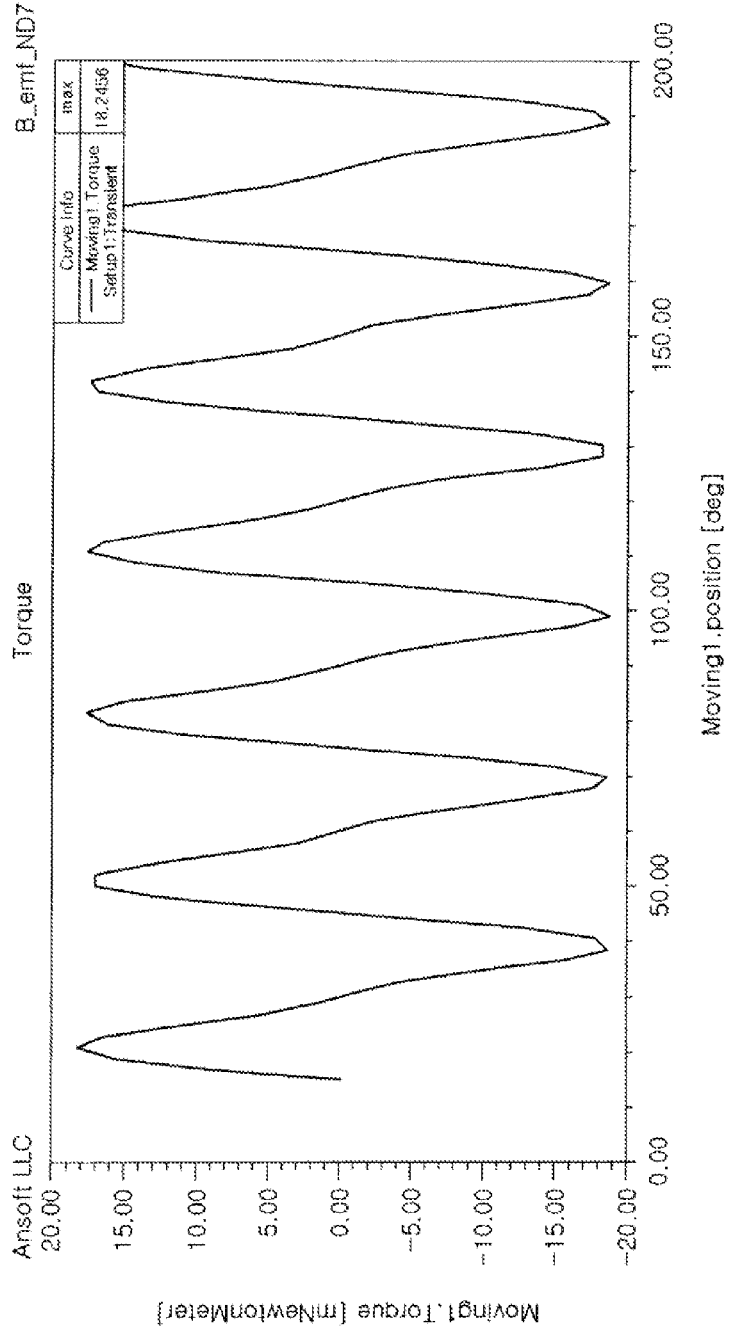
FIG. 8 is a detailed view of a graph about cogging torque of the model according to the related art of FIG. 6.
Figure 9:
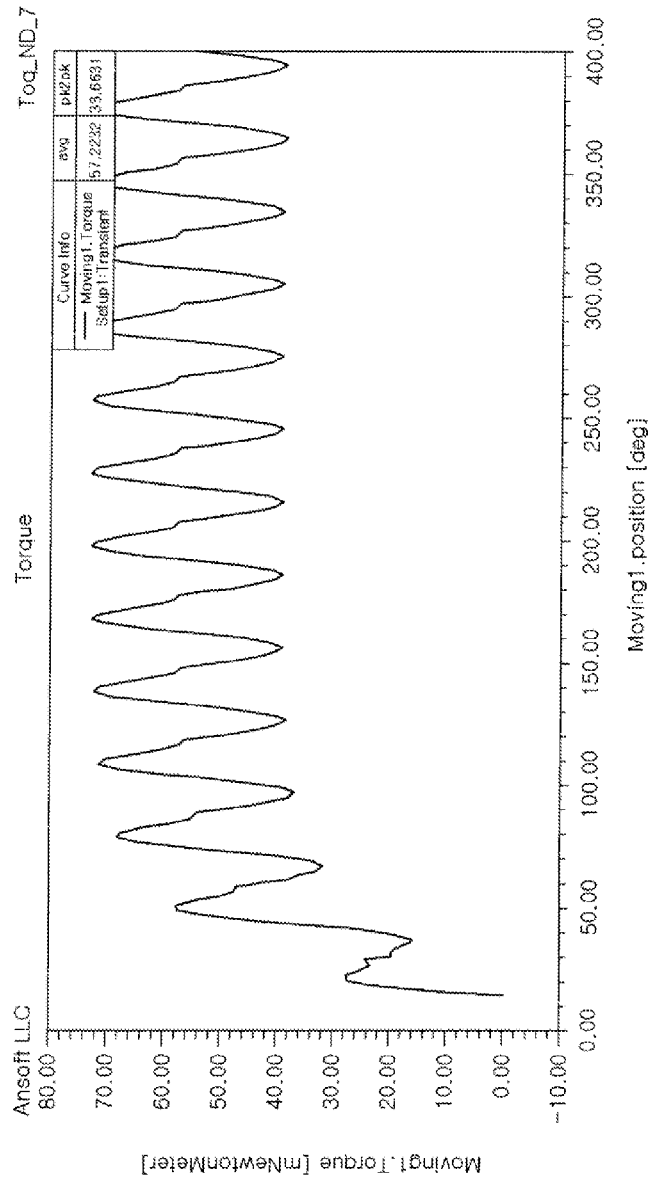
FIG. 9 is a detailed view of a graph about an operational torque of the model according to the related art of FIG. 6.
Figure 10:
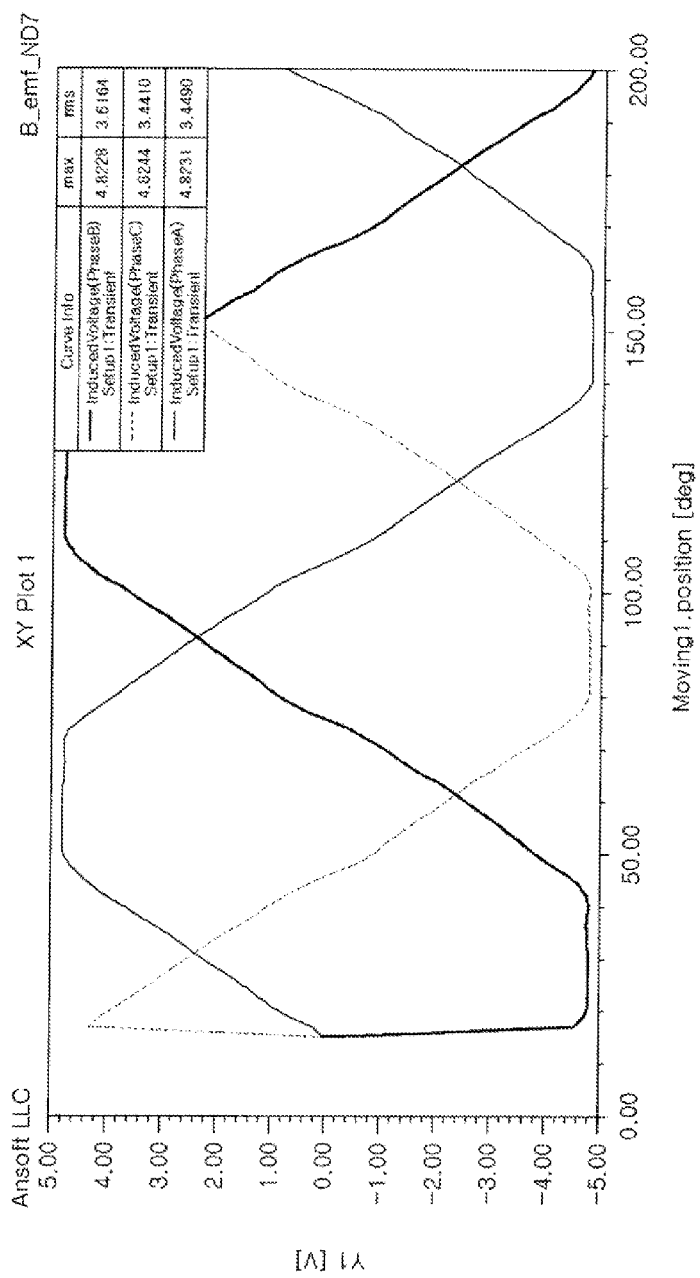
FIG. 10 is a detailed view of a graph about counter electromotive force of the model according to the related art of FIG. 6.
Figure 11:
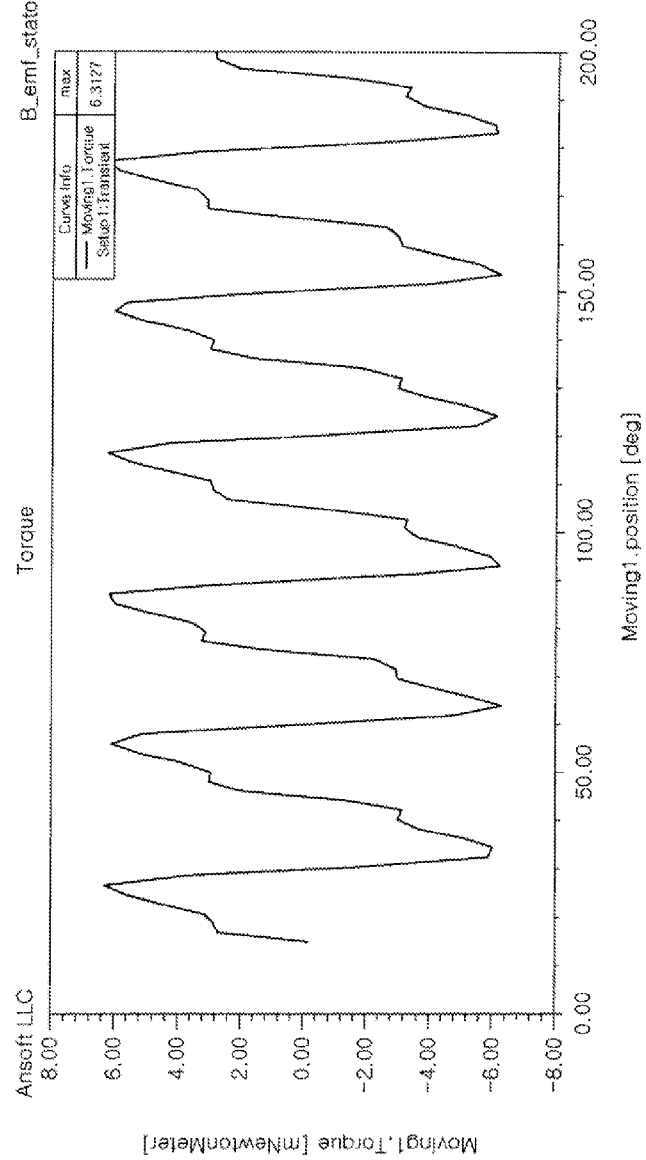
FIG. 11 is a detailed view of a graph about cogging torque of the first modified model of FIG. 6.
Figure 12:
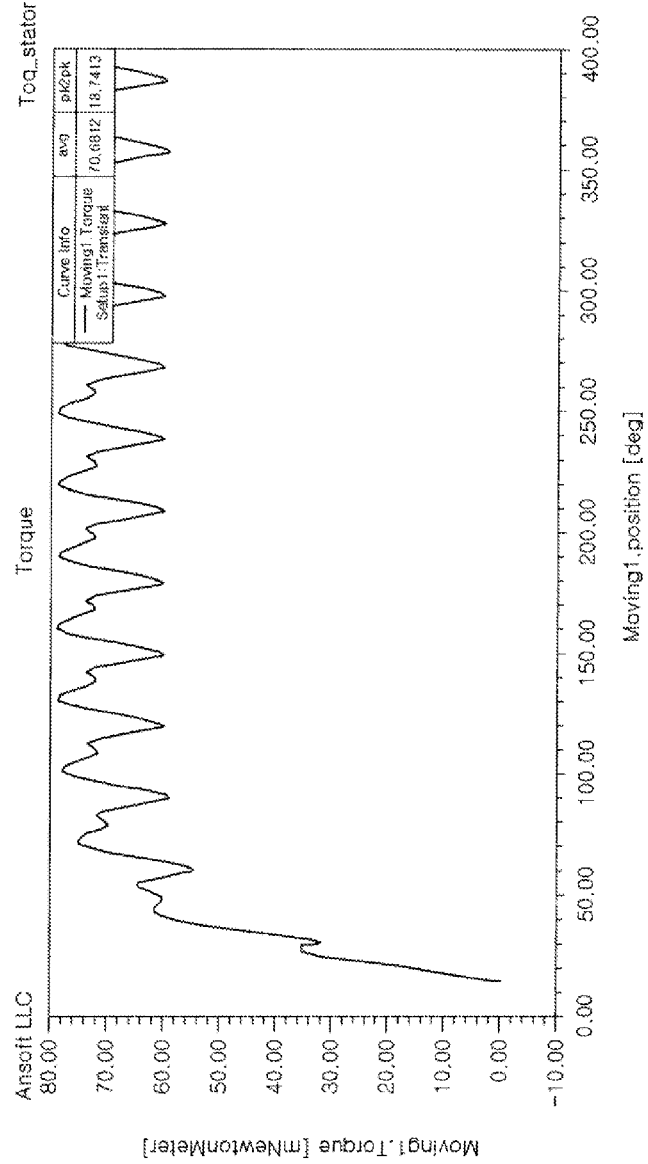
FIG. 12 is a detailed view of a graph about an operational torque of the first modified model of FIG. 6.
Figure 13:
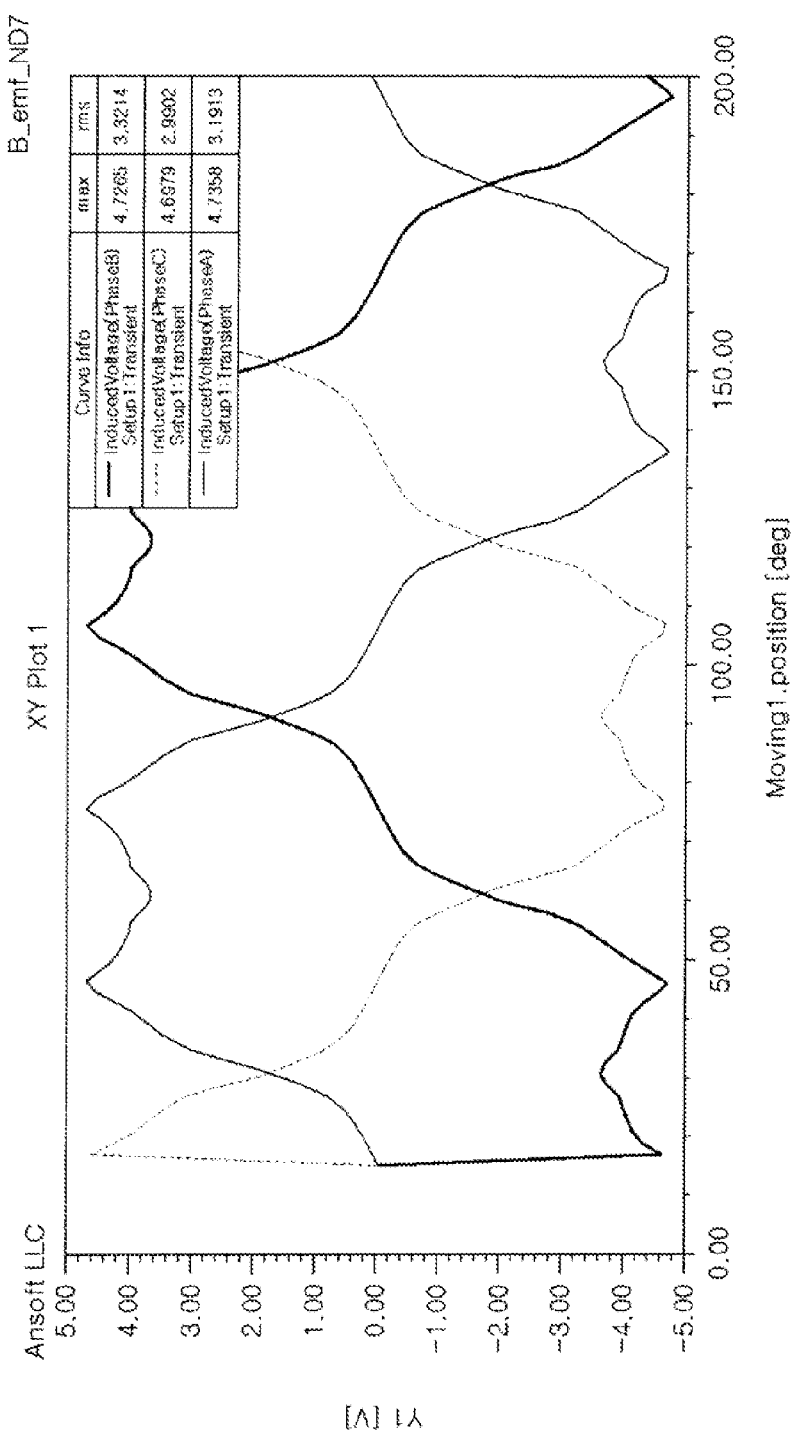
FIG. 13 is a detailed view of a graph about counter electromotive force of the first modified model of FIG. 6.
Figure 14:
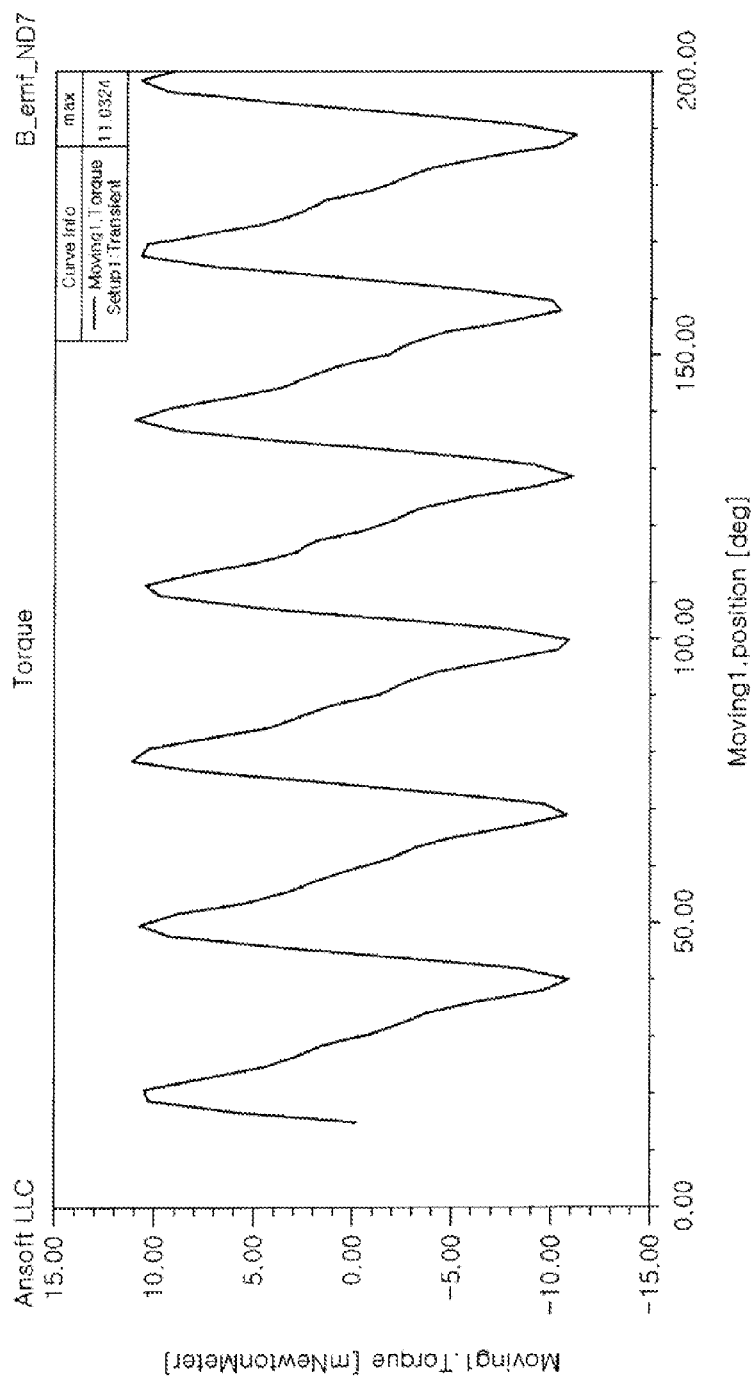
FIG. 14 is a detailed view of a graph about cogging torque of the model according to the present invention of FIG. 6.
Figure 15:
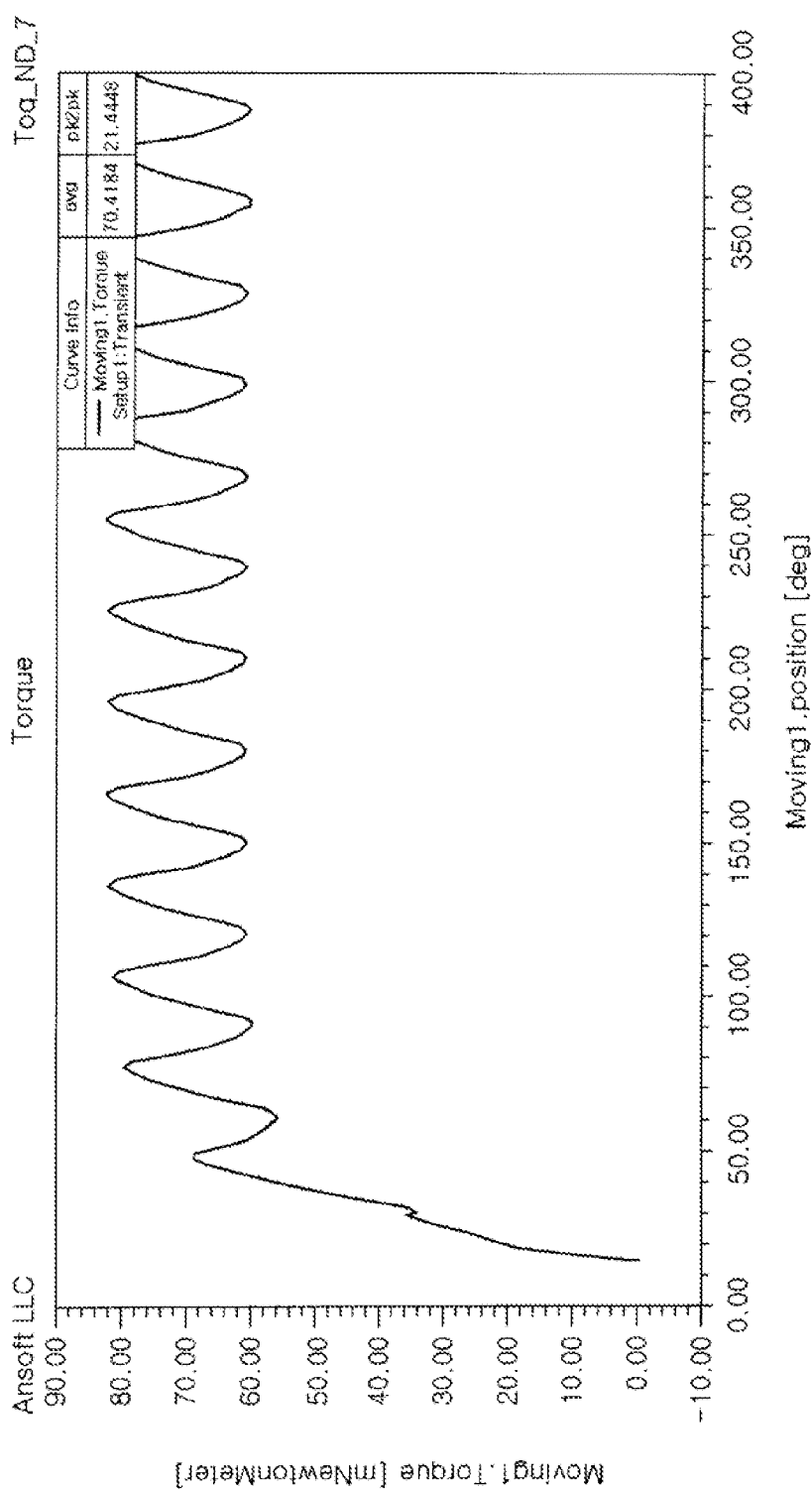
FIG. 15 is a detailed view of a graph about an operational torque of the model according to the present invention of FIG. 6.
Figure 16:
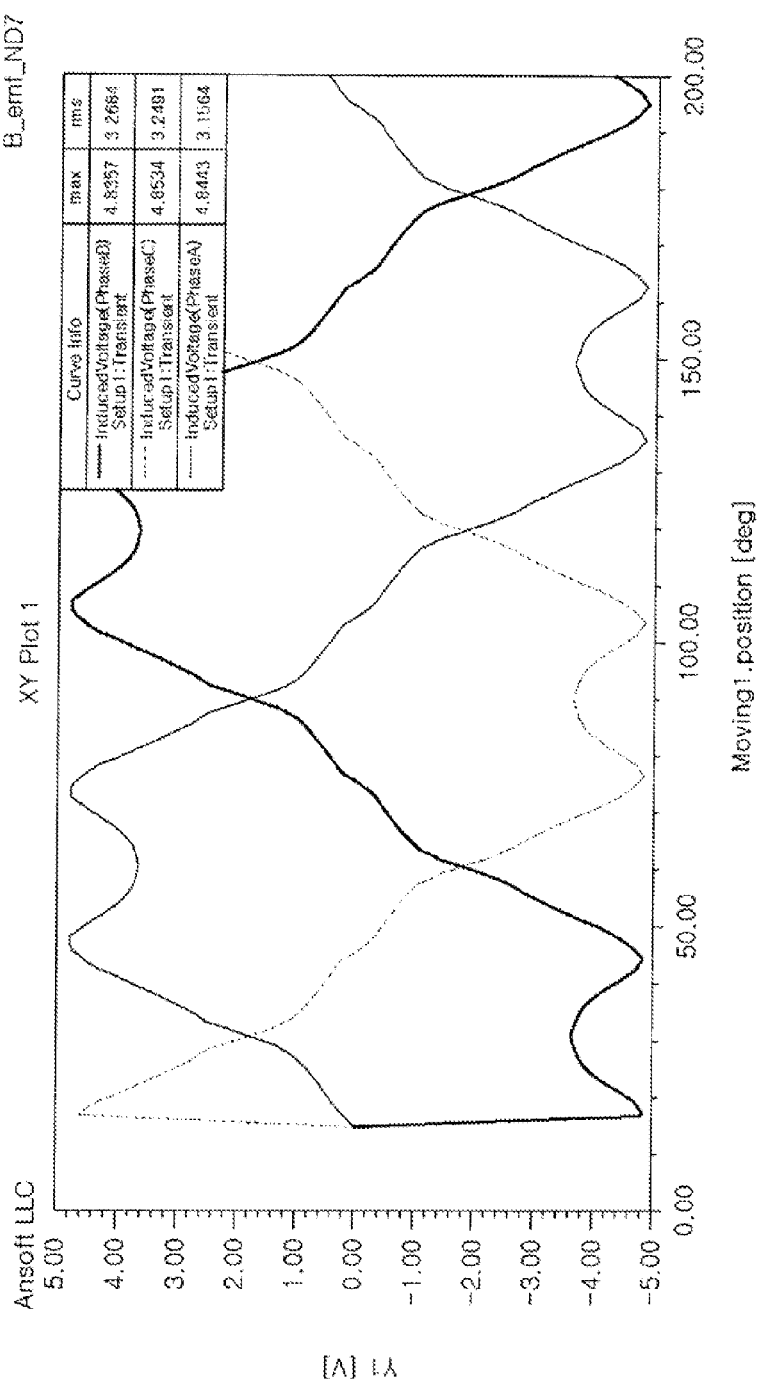
FIG. 16 is a detailed view of a graph about counter electromotive force of the model according to the present invention of FIG. 6.

FIGS. 6 and 7 show test results for a model of simple brushless motors in the related art, a first modified model manufactured by additionally forming core shoe grooves to the model according to the related art, and a model of the present invention manufactured by changing the shape of the bridge holes in the first modified model, in which the waveforms of cogging torque, operational torque, and counter electromotive force are compared and shown for each model. For reference, FIGS. 8 to 16 show detailed views of graphs used in FIGS. 6 and 7.

Comparing first the cogging torque with the operational torque, when core shoe grooves are formed as in the first modified model, the magnitudes of cogging torque and torque ripple are considerably decreased as compared with the model according to the related art; however, ripple is generated in the cogging torque and the torque waveform of the operational torque is distorted, such that the motor may make vibration and noise.

Therefore, when the shape of bridge holes are additionally changed as in the model according to the present invention, as shown in the figures, the cogging torque becomes larger than the first modified model, but smaller than the model according to the related art and a smooth waveform without ripple is achieved. Further, the magnitude of operational torque largely increases as compared with the model according to the related art, and the torque ripple is larger than the first modified model, but is significantly reduced as compared with the model according to the related art, such that it is possible to ensure overall excellent characteristics of the motor.

Further, comparing the state of the counter electromotive force for controlling the electric current that is applied to the stator wires without using a sensor with reference to FIG. 7, the counter electromotive force is largest and ideal waveform is obtained in the model according to the related art; however, large cogging torque and torque ripple are generated as described above, such that it is not preferable in terms of overall characteristics of the motor. Further, when a change is applied as in the first modified model for improving the cogging torque and the torque ripple, as shown in the figure, the waveform of the counter electromotive force is distorted sharp and control becomes difficult. Accordingly, when the configuration is changed as in the model according to the present invention, as shown in the figure, a smooth waveform without deformation is formed, though not better than the model according to the related art, such that easier characteristics are provided for the control.

As a result, the model according to the present invention is a model that is provided with various characteristics appropriately optimized, including the cogging torque, operational torque, and counter electromotive force, such that it is possible to provide characteristics of a motor that can be easily controlled, operates stably without noise, generates relatively large operational torque, and has excellent durability.

What is claimed is:

1. A brushless motor for a fluid pump, comprising:
    a stator core having a cross section in which six core shoes symmetrically protrude toward the center of a circle and six slots for winding are formed between the core shoes, wherein two core shoe grooves recessed in the longitudinal direction of the stator core the inner side of each of the core shoes are each formed with a center on a core shoe groove center line spaced apart at 8.4°±1° from a straight line passing through the center of the core shoe from the center of the stator core, and the width and depth of the core shoe grooves are 1.5 mm±0.5 mm and 0.53 mm±0.1 mm, respectively,
    a rotor core, which is inserted in the stator core, has rectangular permanent magnet holes that are formed in the circumferential direction from the center of the rotor core to be filled with four permanent magnets,
    symmetric bridge holes are formed at both ends of the permanent magnet hole,
    the bridge hole has a first wall that is spaced apart at 14.7°±2° from a straight line passing through the center of two adjacent permanent magnet holes from the center of the rotor core, a second wall that is connected to the first wall and spaced inside while maintaining a uniform thickness of 0.6 mm±0.1 mm from the outer circumference of the rotor core, a third wall that is connected to the second wall and spaced apart at 0.3 mm±0.1 mm from and in parallel with a straight line passing through the center of two adjacent permanent magnet holes from the center of the rotor core, and a fourth wall that is connected with the first wall and spaced apart at 0.35 mm±0.1 mm from and in parallel with a wall, which is closer to the center of the rotor core, of the permanent magnet hole, and
    the length of the fourth wall forming the bridge hole is set to 0.41 mm±0.1 mm.

2. The brushless motor for a fluid pump according to claim 1, wherein the first wall to the fourth wall forming the bridge hole are connected in the order of the fourth wall-the first wall-the second wall-the third wall, and
    the portion between the fourth wall and the third wall is communicated with the permanent magnet hole.

3. A fluid pump using a brushless motor, comprising:
    the brushless motor according to claim 2;
    a cover in which the brushless motor is disposed;
    a connector that is disposed to seal one side of the cover, has a terminal for supplying electricity to the brushless motor, and is equipped with a check valve discharging pumped fluid;
    a spring buffer that elastically supports a rotary shaft of the brushless motor against the connector;
    a lower casing that is disposed to seal the other side of the cover;
    an upper casing that is disposed above the lower casing; and
    an impeller that is disposed between the lower casing and the upper casing and pumps fluid by using rotational force transmitted from the rotary shaft of the brushless motor.

* * * * *